March 30, 1943.  S. F. DAVENPORT  2,315,247
FISH LURE
Filed March 5, 1942

Inventor
S. F. Davenport
By Eccleston & Eccleston
Attorneys

Patented Mar. 30, 1943

2,315,247

UNITED STATES PATENT OFFICE 2,315,247

FISH LURE

Sam F. Davenport, Garrett, Ind., assignor to Creek Chub Bait Company, Garrett, Ind.

Application March 5, 1942, Serial No. 433,523

1 Claim. (Cl. 43—46)

This invention relates to a fishing lure and has for one of its objects to generally improve baits of this type, not only as to their fish catching qualities, but also to reduce the cost of manufacture, assembly, etc.

To this end it is an object of the present invention to provide a lure body which will vibrate or swish as it is drawn through the water in simulation of a minnow or other small fish; the parts causing such action being formed as an integral part of the lure body.

Another object of the invention resides in the provision of a lure body having a narrowed neck portion behind the head of the lure, whereby to improve the vibrating or swishing of the lure.

Other objects and advantages of the invention will be apparent to those skilled in the art, from the following description when taken in connection with the accompanying drawing, in which, Figure 1 is a side elevational view of the new lure.

Figure 1:
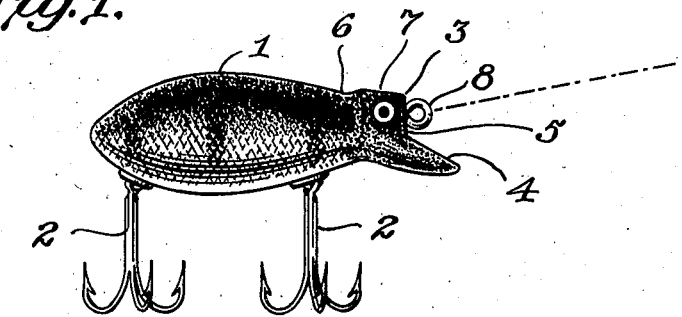

Referring to the drawing in more detail, the numeral 1 indicates the body of the lure and which is formed of any preferred buoyant material. Suspended from the lure body 1 on the underside thereof are gang hooks 2, of any conventional type and which are swivelled to the body in any well known manner, adjacent the front and rear thereof.

The main portion of the body 1, that is the portion to which the hooks are attached, may be of any desired shape, the novel features of the invention residing in that portion of the lure body which is forward of the hooks, and which will now be described.

As heretofore mentioned, the lure body is formed as a single unit, that is, the head portion 3 is integrally formed with the main body of the lure to which the hooks 2 are attached. This head portion 3 is shaped to provide a downwardly-inclined diving plane or lip 4, and also a substantially vertically disposed wall 5 extending upwardly from the diving plane and immediately to the rear thereof. The purpose of the diving plane 4 is to direct and maintain the lure body slightly below the surface of the water when a forward motion is imparted to the lure, and the perpendicular wall 5 serves as a baffle or abutment in conjunction with the water impinging there against, to impart a vibrating or swishing action to the lure body.

Slightly to the rear of the head portion 3 of the lure body a narrowed or necked-in portion 6 is provided in the lure body. This narrowed portion is indicated more clearly in Figure 2 and has for its primary purpose to relieve the water pressure on the sides of the body as the lure is drawn through the water, thereby permitting greater freedom of action of the lure to vibrate by reason of the coaction of the water against the perpendicular wall 5.

Figure 2:
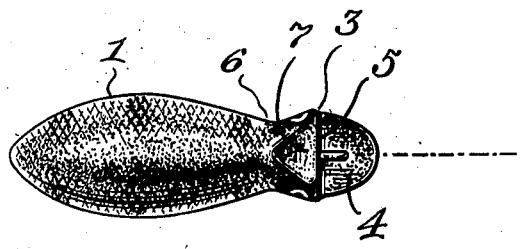
Figure 2 is a plan view.

The upper surface of the head 3 is formed with a flattened substantially horizontal top portion 7, shown as of triangular shape in Figure 2, and this flattened portion functions to maintain the travel of the lure body in a more or less uniformly horizontal plane.

Figure 3:
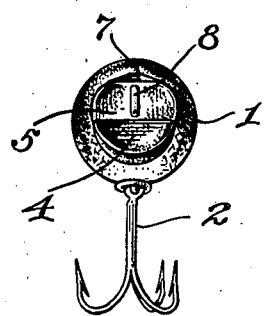
Figure 3 is a front elevational view.

A line-attaching eye 8 is secured to the forward portion of the lure, preferably about midway of the height of the vertical wall 5, as indicated in Figures 1 and 3.

The fishing lure as described herein is attractive in appearance; it is highly successful in operation due to the pronounced vibrating effect produced by the vertical wall 5 in conjunction with the narrow neck 6; and it is extremely simple and inexpensive to manufacture due to the fact that the operating parts are integrally formed on the lure body thereby eliminating the necessity of assembling a body with parts to cause the vibration of the body.

While the fishing lure has been described herein in detail, it will be understood that various changes may be made without departing from the spirit of the invention, and it is intended that all such changes be included within the scope of the appended claim.

What I claim is:

A fish lure body composed of a single piece of buoyant material, and comprising a head portion provided with a downwardly-inclined diving plane on its forward end, a substantially vertically disposed wall extending upwardly from the rear edge of the diving plane, the lure body being narrowed directly behind the head portion, and the top of the head portion being flattened to provide a substantially horizontal plane.

SAM F. DAVENPORT.